June 3, 1969　　　W. B. HOLDRIDGE　　　3,447,245
METHOD FOR CUTTING RADII ON WORKPIECE
Original Filed June 14, 1965　　　Sheet 1 of 2
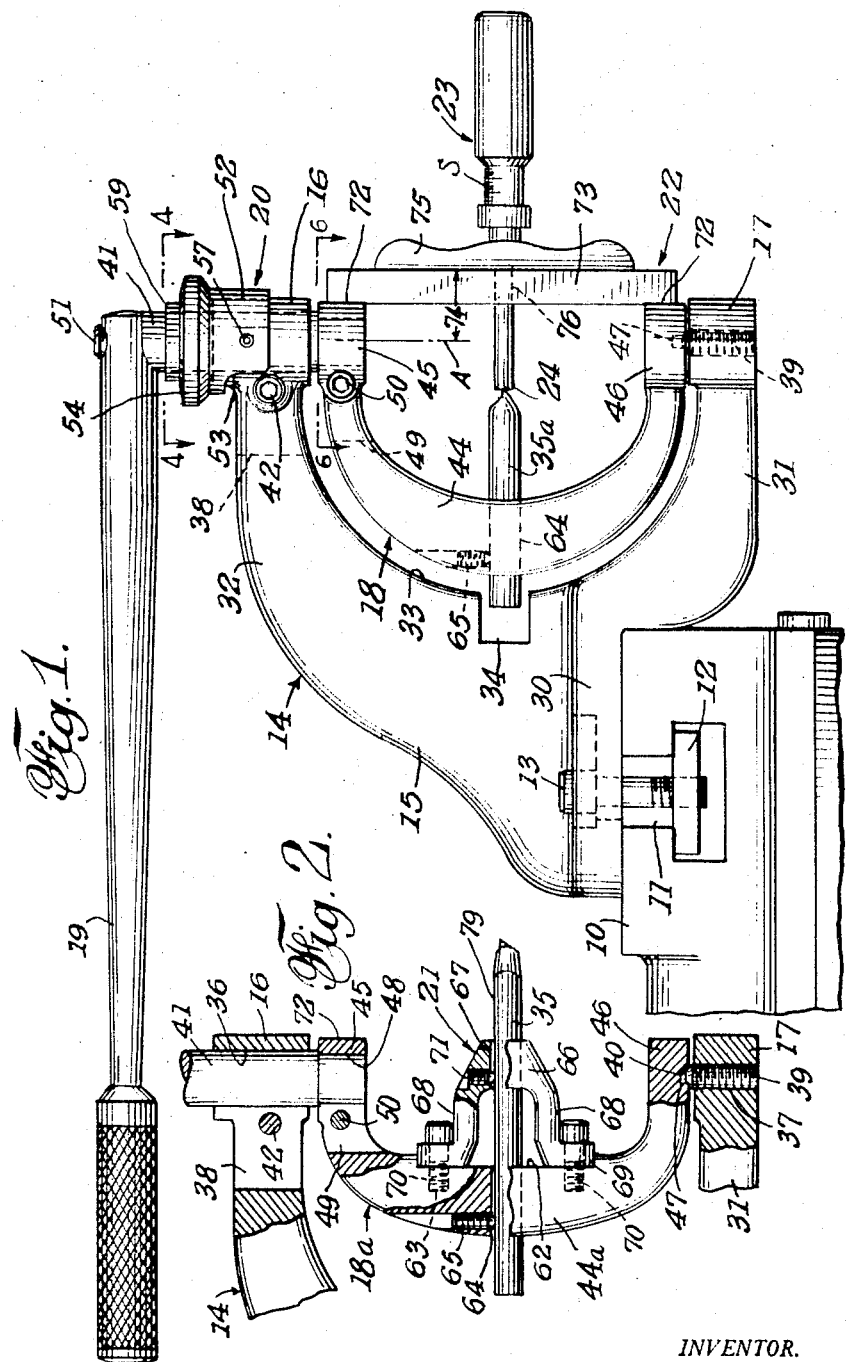
INVENTOR.
WARREN B. HOLDRIDGE
BY C. G. Stratton
ATTORNEY

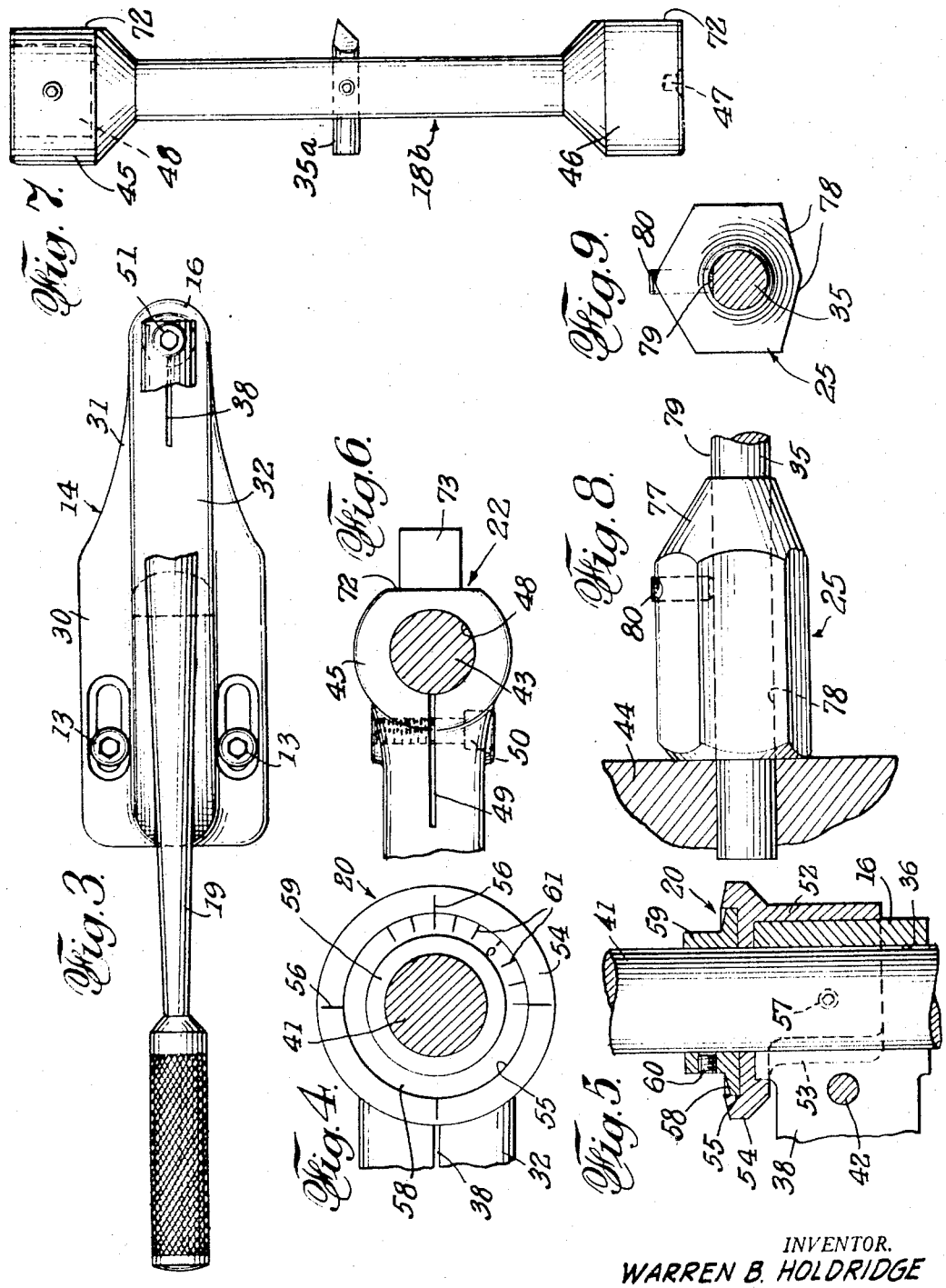

United States Patent Office 3,447,245
Patented June 3, 1969

3,447,245
METHOD FOR CUTTING RADII ON WORKPIECE
Warren B. Holdridge, 116 W. 154th St.,
Gardena, Calif. 90247
Original application June 14, 1965, Ser. No. 463,780, now Patent No. 3,345,893, dated Oct. 10, 1967. Divided and this application Nov. 21, 1966, Ser. No. 595,956
Int. Cl. B27g 23/00
U.S. Cl. 33—185         3 Claims

ABSTRACT OF THE DISCLOSURE

The method of locating the cutting end of the bit on the yoke of a radii cutter in which a micrometer depth gauge is placed at a known distance from the axis of rotation of the yoke and, when adjusted to a position readable on the micrometer, serves as a locator for the cutting end of the bit.

---

This application is a division of my pending application, Ser. No. 463,780, filed June 14, 1965, now Patent No. 3,345,893.

The present invention relates to a method for cutting radii on rotating workpieces, the same thereby being adapted to cut annular half-round grooves in the peripheries of round members, semi-spherical concavities, semi-spherical as well as ball ends on round stock, and other such shapes that are formed by radii cuts.

An object of the present invention is to provide a method for accurately measuring the position of the point of the cutter or bit of a radii cutter, thereby greatly facilitating set-up, and for providing novel and improved means for carrying out said method.

Another object of the invention is to provide a method that facilitates accurate location of the cutting end of a bit in a radii cutter yoke relative to the axis on which the yoke is turned to move the bit in its cutting operating on a rotating workpiece, and including the step that includes accurate adjustment of a bit-locating gauge relative to a portion of the yoke that is offset from said axis a known distance.

The above-enumerated objects of the invention are realized in a method which uses a device that comprises a frame that is adapted to be mounted on the compound rest of a lathe or similar machine, a plurality of interchangeable members comprising both C-yokes and straight spindles for mounting tool bits of different sizes and for various types of cutting operations, simple mounting, dismounting and locking means being provided to so interconnect a selected C-yoke or spindle with the frame that said yokes or spindles are rotational on a preferably vertical axis, causing the cutting end of the bit thereof to turn around said axis, and providing means that locates a micrometer depth gauge so the spindle thereof, when adjusted to the desired gauging distance, locates the cutting point of a tool bit on the yoke or spindle which carries it so the same describes measured arcuate cutting paths that are convex or concave, according to the disposition of said cutting point in relation to the axis on which a handle turns said bit-provided yoke or spindle. Calibrated dial means may be mounted with a fixed part thereof on the frame and a rotational part on the spindle so that the angle included in the sweep of the bit point may be measured.

The mentioned means that locates a depth gauge is simply comprised of a gauge bar of a known thickness and aligned faces on the mounting bosses of the C-yokes and straight spindles against which said bar is adapted to be positioned, with a micrometer depth gauge adapted to be applied to said bar with its measuring spindle extending through a hole in said gauge bar. The distance from the axis of rotation of said yokes or straight spindles to the mentioned aligned faces is also known. Thus, the frame of the depth gauge is spaced from the rotation axis a known distance and reading of the micrometer setting is rendered simple.

This invention also has for its object to provide a novel, economical and convenient method or process of superior utility.

The invention also comprises novel combinations of method steps, which will appear more fully in the course of the following description of the present method or process, the same being based on the accompanying drawings. However, the following specification merely discloses one embodiment of the present invention, and the same is given by way of example only.

In the drawings, like reference characters designate similar parts in the several views.

FIG. 1 is a side elevational view of a radii cutter according to the present invention, the same showing one form of C-yoke and the manner of gauging the desired position of the cutting end of the tool bit mounted on said yoke.

FIG. 2 is a fragmentary and partly sectional view of a modification that is provided with another form of C-yoke and with a support for bits that have long extension from said yoke.

FIG. 3 is a plan view of the radii cutter shown in FIG. 1, the dial means shown in the latter view being omitted.

FIG. 4 is an enlarged cross-sectional view as taken on line 4—4 of FIG. 3, showing the dial means in plan.

FIG. 5 is a vertical sectional view taken through the center of FIG. 4.

FIG. 6 is a cross-sectional detail view as taken on the line 6—6 of FIG. 1.

FIG. 7 is an elevational view of one form of straight bit-mounting spindle that is interchangeable with the C-yokes of FIGS. 1 and 2.

FIG. 8 is a side view of a fixture that may be applied to a bit in a C-yoke or straight spindle for guiding the rake angle on which the bit is ground.

FIG. 9 is an end view of said fixture.

FIG. 1 shows a conventional compound rest 10 having the usual key slot 11 for a tie-down plate 12 which, by means of cap screws 13, fixedly secures the present radii cutter 14 in operative position with respect to a workpiece mounted to turn on a horizontal axis as in a lathe, for instance.

The present radii cutter 14 is shown as a frame 15 having vertically spaced and axially aligned mounting bosses 16 and 17, tool bit-mounting members 18 (FIG. 1), 18a (FIG. 2), and 18b (FIG. 7), mounted for rotational movement around the axis on which the bosses 16 and 17 are aligned, a handle 19 for turning said members 18, 18a and 18b about said axis, dial means 20 for reading the angle of movement of the members 18, 18a or 18b, as the case may be, about said axis, a bit support 21 to steady the cutting operation of a bit that has substantial longitudinal projection from the member mounting it, means 22 for locating a micrometer depth gauge 23 so that the end of the spindle 24 thereof accurately positions the cutting end of a bit to describe the desired radius of its cut, and a fixture 25 for guiding the sharpening or grinding of a bit to insure proper rake angles thereon.

The frame 15 is strongly formed to have a base portion 30 that is adapted to rest upon a compound rest 10 when secured thereto, as above explained, a lower forward extension 31 terminating in the boss 17, and an upwardly and forwardly directed body portion 32 that terminates in the boss 16. The latter portion is formed with an arcuate concavity 33 that is approximately semicircular, a clearance notch 34 being provided in the concave side of the body portion about midway between the bosses 16 and 17, the same providing clearance for the mounting end of a bit 35 carried by a C-yoke 18, as in FIG. 1, for instance. The boss 16 is shown as having a smooth bore 36 which is on the axis on which the yoke is swingable, and the boss 17 is shown with a threaded bore 37 that is on said axis. A slit 38 extends from said bore 36 laterally part way along the body portion 32. A pivot screw 39 having a pilot end 40 is fitted in said threaded bore 37. Said end 40 is directed toward the boss 16. A spindle 41 is fitted in the bore 36 of said boss 16 and is frictionally clamped by contraction of the wall of said bore by a cap screw 42 that draws the walls of slit 38 together. The degree of friction applied varies the tightness that grips spindle 41. Said spindle preferably is formed with a reduced end 43 that extends toward the boss 17.

The bit-mounting member 18, as shown in FIG. 1, has a C-shaped body 44 having respective upper and lower ends that terminate as an upper boss 45 and a lower boss 46. This member will be called a C-yoke hereinafter. The boss 46, in its lower surface, is provided with a seat 47 into which the pilot end 40 is entered to effect a rotational engagement between the lower portions of the frame 15 and the C-yoke 44. The boss 45 is provided with a bore 48 that is aligned with the seat 47 and into which the spindle extension 43 is fitted. A slit 49, similar to the slit 38, and a slit-closing cap screw 50, are provided for contracting the bore 48 around the spindle end 43 to effect a tight fit of the C-yoke 18 on the spindle 41.

The handle 19 is formed as a long member that is affixed, as by a cap screw 51, to the upper end of the spindle 41; the length of said handle enables application of manually applied force to turn the C-yoke 18 on the axis on which the pivot screw 39 and the spindle 41 are aligned. The handle is preferably separable from said spindle by merely removing said cap screw 51, thereby exposing the end of said spindle so that the dial means 20 may be applied without dismounting the C-yoke 18 and thereby disturbing the position of a bit 35 carried thereby.

The dial means 20 is shown as comprising a tubular body 52 that is fitted over the boss 16 and is open at 53 to accommodate the body portion 32 of the frame 15. The upper end of said body 52 has an enlargement 54 in which a circular seat 55 is formed. One or more index marks 56 are provided on the upper, preferably flatly conical face of enlargement. One or more set screws 57 may be used for separably affixing said body 52 to the boss 16.

The mentioned seat 55 is occupied by a disc 58 formed with a collar 59 that, by means of a set screw 60, is affixed to the spindle 41 so that said disc is rotatable with the spindle. The top face of said disc is provided with a protractor scale 61 which is readable in connection with the index marks 56 to show the angle of movement of the C-yoke 18 around its mounting axis.

The member 18a, shown in FIG. 2, has a modified C-shape in that the body 44a is shallower than the body 44 of C-yoke 18. The member 18a is also a C-yoke, as can be seen, but has a smaller radius of swing around its axis than has the C-yoke 18. The inner side of said body 44a is provided with a flatly machined face 62 in which blind taps 63 are located on opposite sides of the bit-accommodating bore 64.

In cases where the set screw 65 for affixing the bit to the C-yoke is not sufficient to steady the latter, a condition that may be due to an elongated extension of the bit end, as in FIG. 2, the bit support 21 may be used. The same is generally U-shaped, having a central body 66 with a bore 67 through which the bit extends, rearwardly directed legs 68 on opposite sides of said body 66, and outwardly turned feet 69 that engage the face 62 of the C-yoke and are fastened thereto by cap screws 70 that engage in the taps 63. A set screw 71 in the body 66 of the support 21 cooperates with the set screw 65 to provide a longitudinally spaced two-point support for the bit 35.

The modification of FIG. 2 omits the dial means 20, but the same may be applied as above described.

The means 22 is shown as comprising coplanar flat surfaces 72 that are machined in the forward portions of the bosses 45 and 46 of both the C-yokes 18 and 18a and the straight spindle 18b that is shown in FIG. 7, and a preferably square bar 73 that is longer than the distance between said bosses and is adapted to be applied flatly against the surfaces 72. In practice, the distance between the axis of rotation of the C-yokes and straight spindle and the faces 72 has a fixed, known value. The thickness of bar 73 is also known. The sum of these dimensions, therefore, has a fixed value 74, shown in FIG. 1. By applying a conventional micrometer depth gauge 23 with its body 75 in contact with the front face of the bar 73 and its spindle 24 extending through a clearance hole 76 in said bar, the position of the end of said spindle can be found, the same being the difference between the reading on the micrometer scale S on the sleeve of said gauge and the value of dimension 74. By setting the point of the bit 35 against the end of the gauge spindle 24 and tightening the set screw 65, the bit will be located to describe a desired radius. By interposing blocks of known size between the bar 73 and the surfaces 72, the value of dimension 74 is increased accordingly, and the location of bits with their cutting ends on the opposite side of the axis A may be measured as before. It will be clear that said bar 73 and/or the mentioned blocks constitute portions that serve as part of the micrometer body 75.

The fixture 25 is shown as a hexagonal bar with a tapered end 77 having a through bore 78 for a tool bit 35. Said bar is formed to have two oppositely angled surfaces 78, in this case 20°, to guide grinding the proper rake angles on the bits. Since the bits are provided with longitudinal flats 79 and these flats are engaged by the set screws 65 and 71, the tool is always radially oriented with relation to a workpiece on which it operates. By securing said fixture 25 to the bit by a set screw 80 that also engages said flat 79, the surface 78 guide proper rake angle grinding.

With a short bit 35 carried by C-yoke 18, a ball may be machined on the end of a rotating piece of stock. If a neck is to be formed for said ball, a straight spindle 18b may be used. The C-yoke 18 with a bit extending beyond the axis A may be used to form a cup-shaped socket. Such a bit would have a conventional offset. Torus-shaped items having a convex internal radius may be formed, it being necessary only to select the yoke 18, 18a or 18b, the size, length and type of bit, and use the means 22 to locate the bit point to cut the desired radius on a rotating workpiece.

To sum up, the present method consists in placing a depth gauge 23 in a position offset from and parallel to the axis A of the yoke 18 at a known distance 74 from said axis, and with the spindle 24 of said gauge directed toward and aligned with the axis of the bit 35. While in this position, the spindle is longitudinally adjusted to a reading on the micrometer scale S of the gauge, the value of which equals the sum of said known distance and the desired radius of the cut to be made by the bit. The bit is then slid to end contact with said spindle and secured to the yoke in such position.

While the foregoing discloses what is now contemplated to be the best mode of carrying out the invention, the same is, of course, subject to modification without departing from the spirit and scope of the invention. Therefore, it is not desired to restrict the invention to the particular method steps or combination or sequence of method steps described, but to cover all equivalent steps or methods.

Having thus described the invention, what is claimed and desired to be secured by Letters Patent is:

1. A method of setting the cutting end of a tool bit carried by the yoke of a radii cutter and disposed on an axis transverse to the axis around which the yoke is rotatable and which cutting end describes an arcuate cutting path over the surface of a workpiece that is rotating on an axis in the plane of the cutter axis, including the steps of:

(a) placing the body of a micrometer depth gauge including a body and a spindle and the body having an elongated reference surface; in a position parallel to the yoke axis at a known distance from said axis on the side thereof that is opposite to the yoke, by engaging said reference surface with spaced points on the yoke, with the gauging spindle of said gauge aligned with the axis of the bit, (b) adjusting the longitudinal position of said spindle with relation to the yoke axis to a reading on the micrometer scale on the sleeve of said gauge, the value of which is the sum of said known distance and the desired radius of the cut to be made by said bit, and (c) placing the cutting end of the bit against the end of the spindle and securing the same to the yoke.

2. A method according to claim 1 in which the depth gauge body is placed in gauging position against aligned surfaces that are provided on the yoke and are in coplanar relation and parallel to the yoke axis.

3. A method according to claim 1 in which a parallel-sided bar of known thickness is interposed between the body of the gauge and said aligned surfaces and, when adjusting the longitudinal position of the spindle, the thickness of said bar is added to the sum of the known distance and desired radius.

References Cited

UNITED STATES PATENTS

| | | | |
|---|---|---|---|
| 796,903 | 8/1905 | Farrar | 33—170 |
| 1,513,883 | 11/1924 | Bausch | 82—12 |
| 1,737,764 | 12/1929 | Jacobs | 33—170 X |
| 2,155,562 | 4/1939 | Price | 33—170 |
| 2,295,014 | 9/1942 | Schmuldt | 82—12 |
| 2,309,924 | 2/1943 | Root | 82—12 |
| 3,106,023 | 10/1963 | Wilson | 33—170 |

WILLIAM D. MARTIN, Jr., *Primary Examiner.*

U.S. Cl. X.R.

33—169; 82—12